United States Patent [19]
Raetzer et al.

[11] Patent Number: 4,897,827
[45] Date of Patent: * Jan. 30, 1990

[54] VIDEO DISC PLAYER WITH RAPID TRACK ACCESS MEANS

[75] Inventors: Franz H. Raetzer, Harriman; John J. Stitt, Knoxville, both of Tenn.

[73] Assignee: U.S. Philips Corporation, New York, N.Y.

[*] Notice: The portion of the term of this patent subsequent to Jan. 28, 2003 has been disclaimed.

[21] Appl. No.: 205,020

[22] Filed: Jun. 3, 1988

Related U.S. Application Data

[63] Continuation of Ser. No. 5,381, Dec. 12, 1987, abandoned, which is a continuation of Ser. No. 595,082, Mar. 30, 1984, abandoned.

[51] Int. Cl.$^4$ .................. G11B 27/10; G11B 21/10
[52] U.S. Cl. ............................ 369/32; 358/342; 369/44
[58] Field of Search ................ 369/32, 43–46; 358/342

[56] References Cited

U.S. PATENT DOCUMENTS

| | | | |
|---|---|---|---|
| Re. 29,963 | 4/1979 | Janssen | 358/342 |
| 4,106,058 | 8/1978 | Romeas et al. | 360/78 X |
| 4,138,663 | 2/1979 | Lehureau et al. | 365/234 X |
| 4,138,741 | 2/1979 | Hedlund et al. | 360/77 X |
| 4,330,880 | 5/1982 | Van Dijk | 369/32 |
| 4,539,664 | 9/1985 | Deguchi et al. | 369/44 |
| 4,567,534 | 1/1986 | Groen et al. | 358/342 |
| 4,630,250 | 12/1986 | Nonomura | 369/32 |

FOREIGN PATENT DOCUMENTS 57-69536  4/1982  Japan .................. 369/44

OTHER PUBLICATIONS

"A Random Access System Adapted for the Optical Video Disc: Its Input on Information Retrieval", Mathieu, SMPTE, Journal, Feb. 77, vol. 86, pp. 80–83, English translation of JP 57–69536.

Primary Examiner—Aristotelis M. Psitos
Attorney, Agent, or Firm—Algy Tamoshunas; Leroy Eason

[57] ABSTRACT

In an optical disc playback unit a focused laser beam recovers audio and video information recorded on a spiral track on the disc surface for display. A pivotably mounted mirror in optical communication with the beam is actuated to assist the beam in radially following the spiral track during normal playback. Upon command of an external controller, the mirror actuator mechanism is actuated by a rapid track access circuit to cause the beam to be radially relocated from a present playback position on the disc to an alternate predetermined branch location, causing the display to change. A tracking circuit, responsive to movement of the beam over intervening tracks, causes the rapid track access circuit to decelerate the mirror as the beam approaches the branch location to provide accurate repositioning to the branch location.

3 Claims, 6 Drawing Sheets

VIDEO DISC PLAYER WITH RAPID TRACK ACCESS MEANS

This application is a continuation of U.S. application Ser. No. 07/005,381 filed Jan. 12, 1987, which in turn is a continuation of U.S. application Ser. No. 06/595,082 filed Mar. 20, 1984. Both applications are now abandoned.

BACKGROUND OF THE INVENTION

This invention relates generally to a playback device for retrieving optically recorded signals from a spiral track on a reflective, rotating recording disc, and more particularly to a system permitting rapid access to selected locations on the recording disc.

Advancements in laser technology, and the increasing demand for consumer-affordable video playback equipment, have led to the development of optical recording techniques for recording video and audio signal information. In systems incorporating such techniques, video and audio information is recorded on a continuous spiral track along the surface of a rapidly rotating reflective optical recording disc. During playback, a beam is focused onto the recording track to recover the recorded signal. Appropriate mechanisms and control circuitry assure accurate tracking of the recording track with the focused beam.

Optical recording discs have the advantage of being compact and easily handled. Since no directed mechanical contact with the recording surface is required to retrieve recorded information during playback, optical recording discs exhibit little or mor degradation of signal quality despite numerous playbacks. In addition, the disc format, in contrast to magnetic tape formats, provides convenient access to all parts of a recorded program. This permits optical playback devices to provide such special features as stop-action, slow or fast motion, or reverse action during playback of a recorded program.

Some applications, such as, for example, user-interactive video games with branching functions, require the ability to rapidly locate and display specific portions of the pre-recorded material at separate spaced locations on the disc. In such applications, it is necessary to rapidly and accurately direct the focused beam to the appropriate branch location, or frame, on the disc recording surface. Where it is desired to provide a number of possible branch locations, it is necessary that the playback beam be capable of advancing or retreating multiple frames as quickly as possible.

A system for accurately positioning a beam during playback of an optically recorded program is described in U.S. Pat. No. RE 29,963, incorporated by reference herein. In this system, the optical playback elements are mounted on a sledge, which is radially movable along the undersurface of the recording disc. Radial movement of the sledge provides coarse tracking of the recording track by the playback beam, while instantaneous fine adjustment of the beam position is provided by means of an angularly displaceable mirror in the optical path. While this system permits jumps of one track, as during still frame and slow motion effects, no provision is made for effecting jumps of multiple tracks, as would be desirable to adapt a video disc playback unit for use with, for example video games.

SUMMARY OF THE INVENTION

The present invention provides a system for providing controlled rapid branching from any track location of an optically recorded program to another track within the field of view of the optical playback elements in response to instructions generated by a computer within the playback apparatus. To minimize branching time, a radially movable mirror which positions the playback beam on the disc is initially rapidly accelerated and then maintained at a desired speed until the desired location is approached. Prior to reaching the desired branch location, the mirror is decelerated in a controlled manner and finally stopped at that location. A computer monitors the beam location and generates appropriate instructions for controlling mirror movement in response to the instantaneous beam position and the position corresponding to the desired branch location.

The invention provides a mechanism for rapidly and accurately repositioning the playback beam. Since the average track width of standard optical recordings is approximately 0.4 micro-meter and since the average track spacing is 1.4 micro-meter, it will be appreciated that such repositioning must be effected with considerable accuracy.

BRIEF DESCRIPTION OF THE DRAWINGS

The features of the present invention are set forth with particularity in the appended claims. The invention, together with the further objects and advantages thereof, may best be understood by reference to the following description taken in conjunction with the accompanying drawings, in the several figures in which like reference numerals identify like elements and of which:

DESCRIPTION OF THE PREFERRED EMBODIMENT

Figure 1:
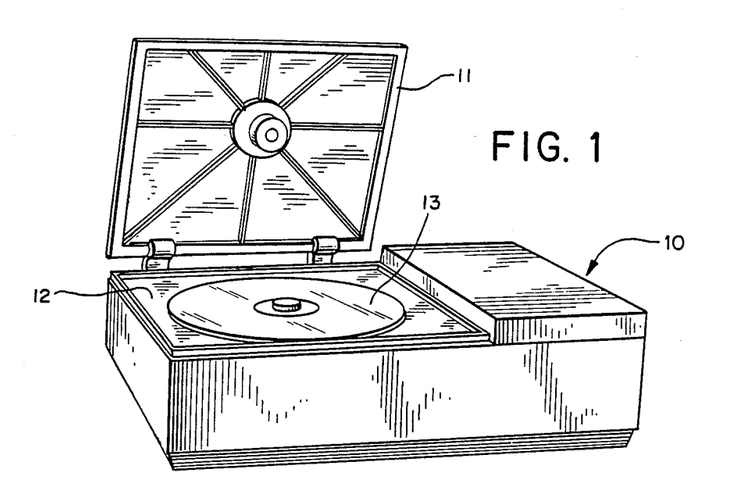
FIG. 1 is a perspective view of an optical disc playback unit having a rapid track access system constructed in accordance with the invention.

Referring to the figures, and in particular to FIG. 1, a video disc playback unit 10 is illustrated. Along its upper surface, playback unit 10 includes a hinged cover 11 which when positioned as illustrated, reveals a recess 12 for receiving an optically recorded video disc 13.

Video disc 13 has been recorded using optical recording techniques and contains, for example, the various scenes called for by a video game format. The playback unit 10 is connected to a game control and display unit (not shown) which generates instructions to the playback unit 10 in response to user manipulation of the game controls, and displays the video signal provided by the playback unit in response to those instructions. Playback unit 10 includes a rapid track access system comprising control circuitry constructed in accordance with the invention which together rapidly and accurately position the playback beam to a track location specified by externally supplied instructions.

Figure 2:
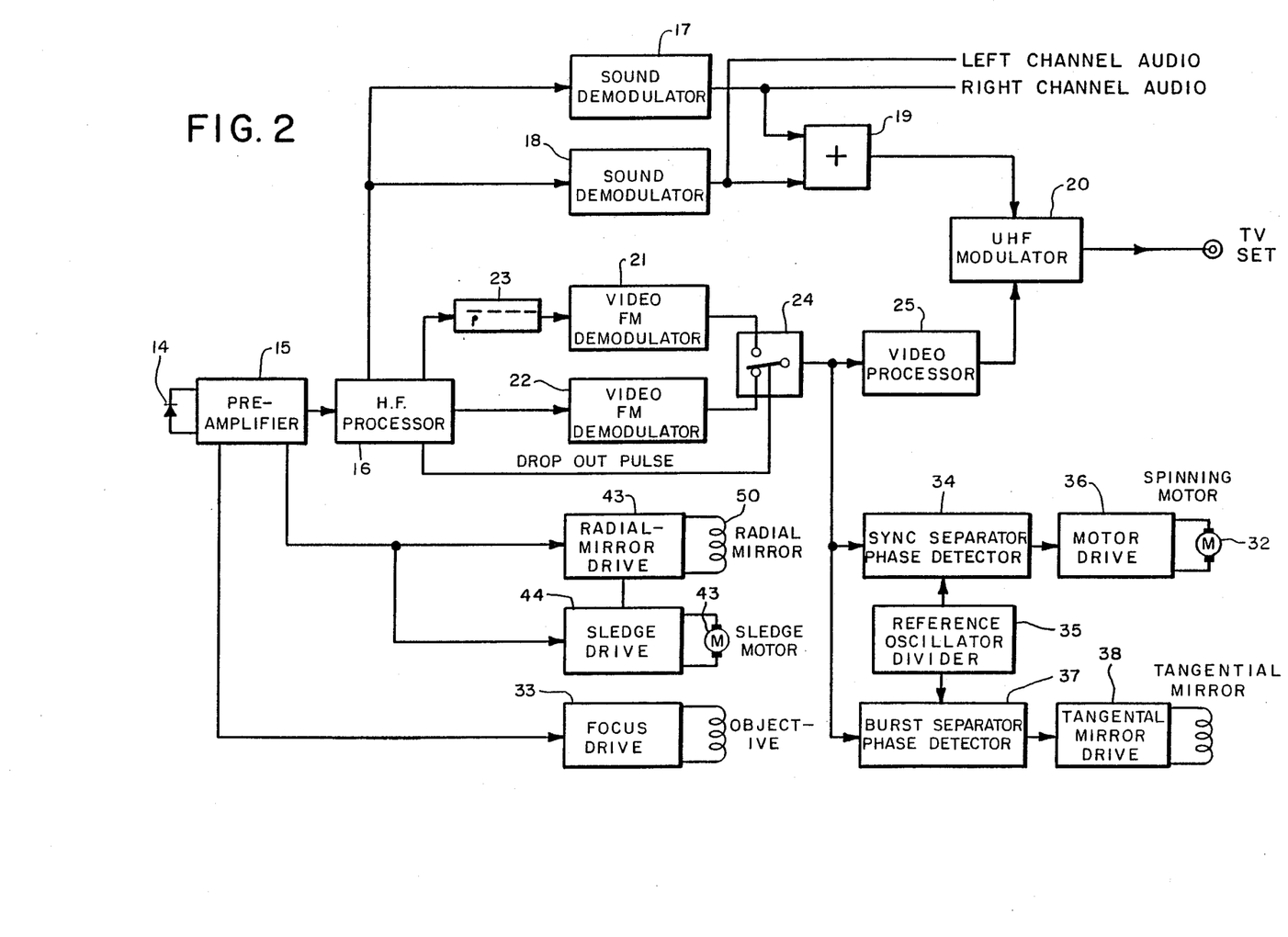
FIG. 2 is a simplified functional block diagram of the playback unit illustrated in FIG. 1 useful in understanding the operation thereof.

The functional structure of video playback unit 10 is illustrated in FIG. 2. Audio and video signals, prerecorded in accordance with an existing format standard, are retrieved in known manner by a suitable playback beam, such as that produced by a laser, which is then detected by a photo detector 14. Audio information is carried on a pair of pulse-width modulated carriers having frequencies of 2.3 MHz and 2.8 MHz. Video information is carried on a frequency modulated carrier having a frequency of 8 MHz. At the time of recording, these signals are combined to form a composite signal which is optically recorded on the video disc in known manner. The composite signal detected by photo detector 14 is first amplified by means of pre-amplifier 15 and is then applied to a high frequency processor 16 which separates the audio and video carriers for application to respective audio and video processing circuits.

The audio processing circuit includes a pair of demodulators 17 and 18 which produce right and left channel audio signals for reproduction by a conventional stereophonic high-fidelity sound reproduction system. Additionally, the audio processing circuit may include a summing circuit 19 which combines the right and left channel signals for application to a UHF modulator 20 to allow use of the playback unit with a standard television receiver (not shown).

The video processing circuit includes a pair of video demodulators 21 and 22 which extract video information from the frequency modulated video carrier. Video demodulator 21 includes a line scan delay circuit 23 which together with a high frequency processor and an electronic switch 24 compensates for momentary signal loss due to imperfections in the disc by redisplaying the immediately preceding frame in the event such signal loss is detected. The recovered video signal is applied to UHF modulator 19 through a video process 25 to allow display of the video signal on a conventional television receiver.

Recovery of the recorded composite signal requires accurate tracking of the spiral track with a focused laser beam. Accordingly, video playback unit 10 includes a radial servo tracking mechanism, the operation of which will be best understood by reference to FIGS. 2 and 3. To recover recorded information, a laser beam from a source 26 is first passed through a lens 27 and through a half-silvered mirror 28 to the surface of a pivotally mounted radially movable mirror 29. From mirror 29, the beam is reflected upward through an objective lens 30 which focuses the beam onto the recording surface 31 of video disc 13 which is rapidly rotated by a motor 32. A focus drive circuit 33 in a manner well known in the art adjusts the position of the objective lens 30 as required to keep the beam properly focused. The recording surface of video disc 13 contains the recorded audio and video information on a precisely dimensioned spiral track beginning adjacent the center of the disc and extending spirally outward toward the edge.

Figure 3:
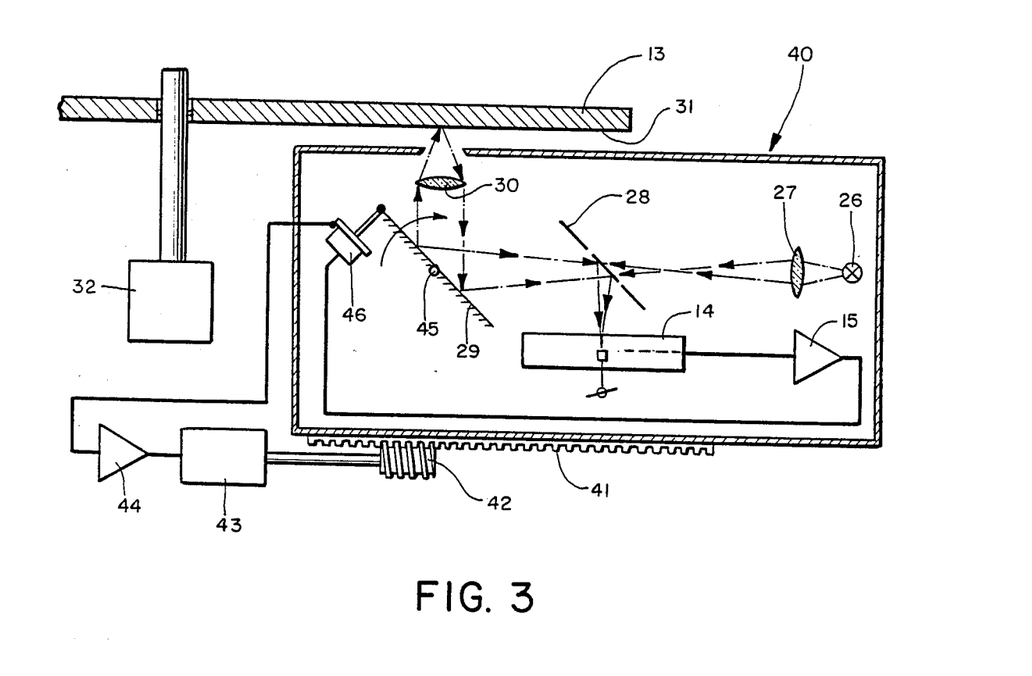
FIG. 3 is a simplified functional diagram illustrating the configuration of the optical playback elements of the playback unit.

The recording surface 31 of video disc 13 is optically reflective, causing light from the focused beam to reflect off the surface, through lens 30, off mirror 29 and off half-silvered mirror 28 onto photo-detector 14. As is well known, the intensity of the reflected signal varies according to the modulation of the recorded signal, resulting in reproduction of the composite signal by the photo detector.

Video disc 13 is rotated at a constant rotational velocity of 1800 rpm by motor 32. When NTSC-television signals are recorded, each frame, together with an associated unique frame number at its beginning, occupies one complete revolution of the video disc, with each field occupying one-half revolution. As shown in FIG. 2, line synchronization pulses included in the recorded video signal and detected by video demodulators 21 and 22 are applied to one input of a sychronization phase detector 34 which compares those signals with those provided by a stable crystal reference oscillator 35 to produce a compensation signal in response to timing errors in the recovered signal. The compensation signal is applied to a servo motor drive 36 which adjusts the motor speed as necessary to maintain the desired rotational speed.

To compensate for timing errors resulting from disc eccentricity, the tangential position of the focused beam on disc 13 is rapidly adjusted by means of a second servo driven mirror (not shown) in the optical path, movement of which results in displacement of the beam position along a tangent relative to the spiral recording track. This is accomplished by comparing the line synchronization pulses with the reference oscillator signal in a burst separator phase detector 37 which produces a compensation signal indicative of timing error. The compensation signal is applied to a tangential mirror drive 38 which alters the position of the tangential mirror to minimize the timing error.

Referring again to FIG. 3, the elements of the optical playback system are mounted on a servo driven sledge 40 which is arranged for coarse radial movement along a track below video disc 13. The sledge can be driven along the radial track by means of a worm follower 41 and worm gear 42 driven by a radial mirror drive motor 43. The motor is driven by a signal provided by a servo amplifier 44 which responds to a control signal derived from the angular position of radial tracking mirror 29. Motor 43 drives worm gear 42 as required for the sledge to roughly track the spiral recording track. To provide fine control of radial beam position, and hence accurate radial tracking of the recording track, mirror 29 is mounted for pivotal movement about a pivot 45 adjacent its center. Movement of the mirror about its pivot causes radial movement of the beam. The position of the mirror is controlled by a servo motor 46 which is responsive to minute misalignment between the beam and the recording track.

Figure 5:
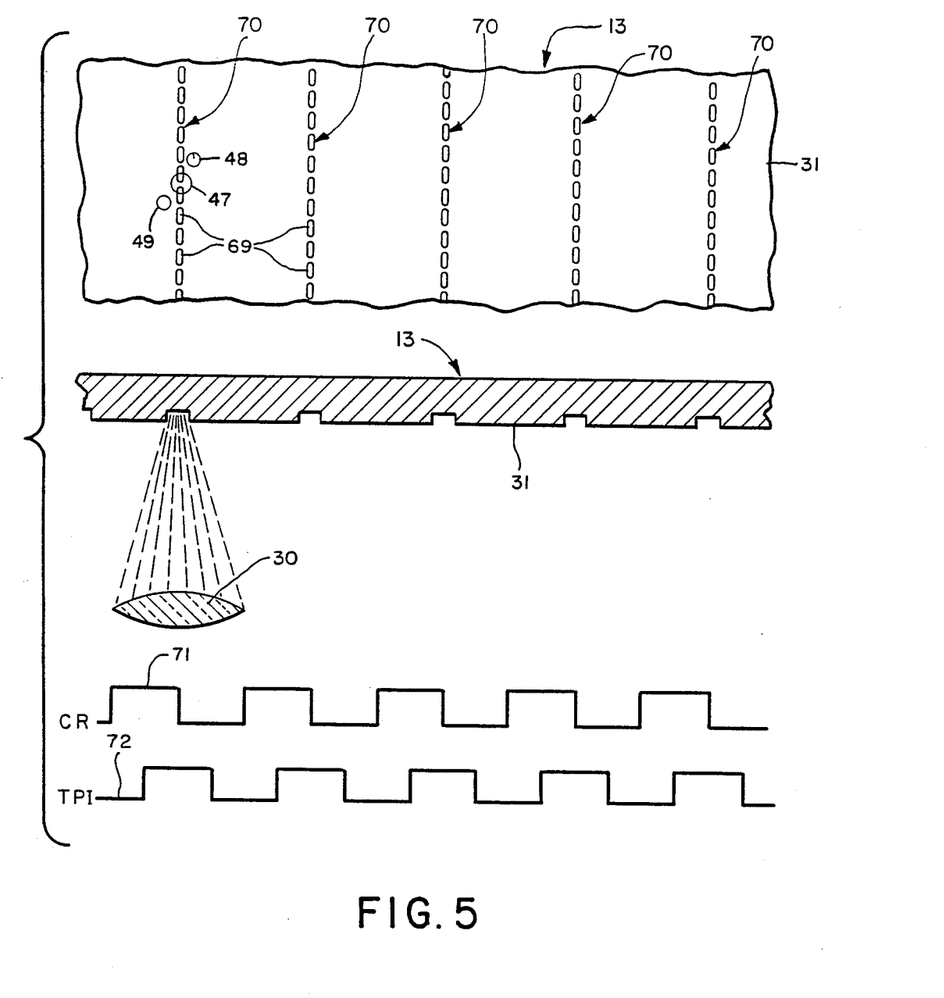
FIG. 5 is a simplified functional diagram useful in understanding the derivation of various beam position indicating signals in the playback unit.

To accurately center the focused beam on the recording track, the reflected beam is first split to produce a main beam 47 and a pair of radial beams 48 and 49 radially displaced from the main beam, as illustrated in FIG. 5. When the beam is accurately centered on the recording track, the reflected radial beams will be of equal intensity. When the beam is not centered, a relative difference in reflected intensities exists. Appropriately located photo detectors respond to the relative intensities of the reflective radial beams to provide control signals to motors 43 and 46 in FIG. 3 which vary the position of mirror 29 and the sledge 40 as required to maintain radial alignment of the beam with the recording track.

While the mechanical limitations of the servo driven sledge assembly prevent the sledge itself from being very rapidly displaced radially along its track, it will be apparent by reference to FIG. 3 that rapid pivotal movement of mirror 29 will result in rapid radial movement of the focused beam over a considerable portion of the video disc within the optical field of view of lens 30. Accordingly, the playback unit may be caused to rapidly skip either forward or backward a large number of frames as a result of a rapid change in the radial position of the beam. The present invention is directed to a system for accurately and rapidly altering the pivotal position of the radial mirror 29 as necessary to relocate the beam from any frame location to any other specified frame location of the recorded video program within the optical field of view at the original location.

The construction of radial mirror 29 may in practice be similar to that of a moving coil ammeter, permitting the angular position of the mirror to be varied in accordance with changes in current through an associated winding 50 (FIG. 2), which can comprise the radial mirror drive motor 43.

Figure 4:
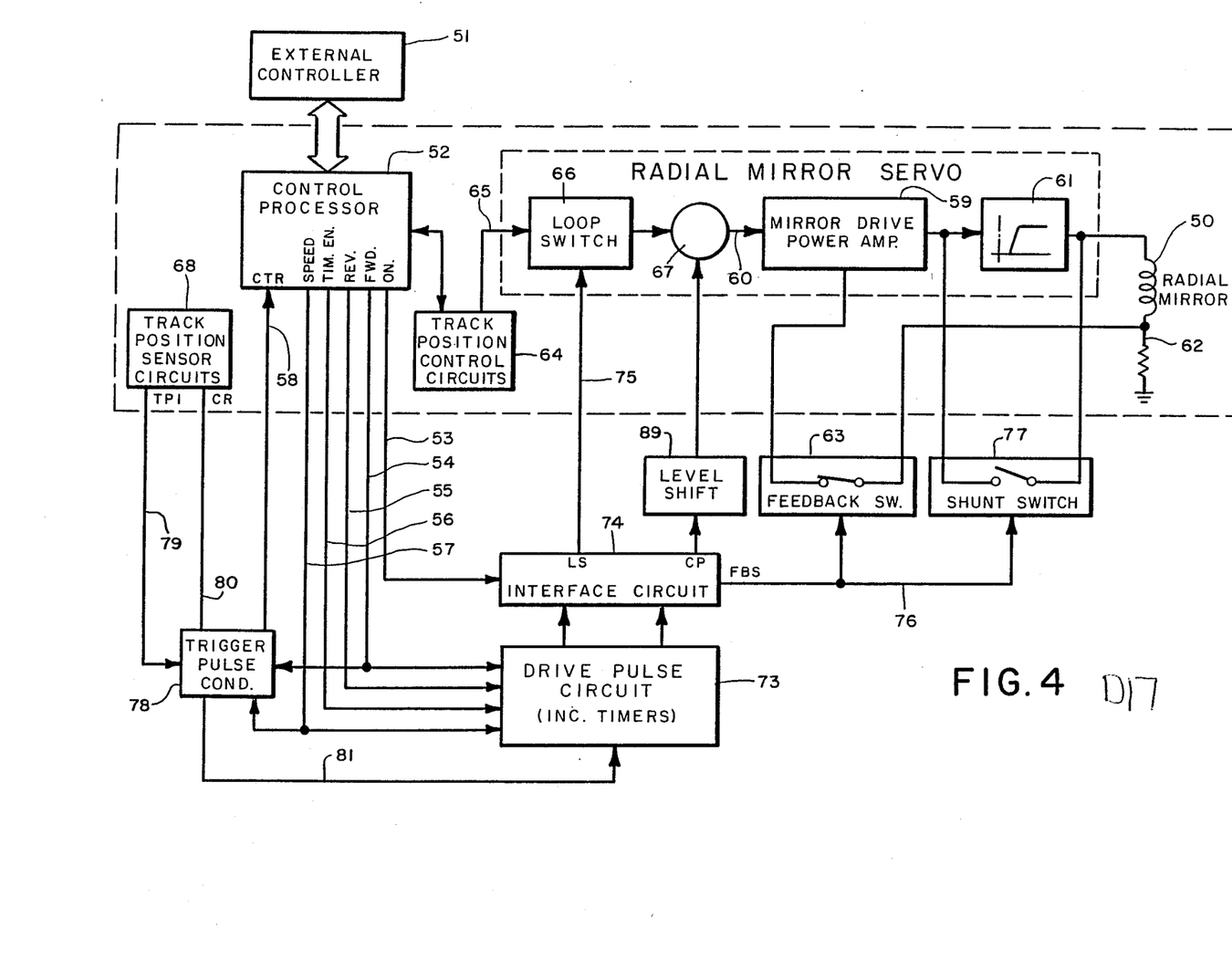
FIG. 4 is a functional block diagram of thea rapid track access system of the present invention in an optical playback unit adapted for use in conjunction with a video game.

The system of the present invention is illustrated functionally in FIG. 4. As shown, the system is adapted for use with a playback unit of conventional design. This unit is controlled by an external controller 51 which may, for example, comprise part of a video game unit. The elements of the playback unit which have previously existed are contained within the broken lines, while the rapid track access circuitry which comprises the present invention are external thereto.

Referring to FIG. 4, the playback unit is seen to include a control processor 52 in data communication with the external controller 51. The processor 52 receives digitally encoded instructions from the external controller and provides control signals in response to those instructions which are used by the circuitry of the present invention to rapidly access the portion of the video disc specified by the instructions.

The control processor 52 produces a number of output signals on output lines 53–57 which control operation of the rapid track access circuitry. An "on signal" applied through line 53 enables the circuitry to permit rapid repositioning of the beam. "Forward" and "reverse" signals, applied through lines 54 and 55, respectively, control the direction in which the beam is deflected. A "speed" signal applied through line 57 controls the speed of the beam as it is deflected. A "timer enable" signal on line 56 is produced after a predetermined time delay following initiation of the beam deflection sequence and is utilized by the rapid track access circuit to control the beam deflection speed.

A counter signal indicative of the clock track-crossing by the focused beam as it is scanned across the video disc is applied to the control processor 52 through line 58. The control processor can thus count the number of tracks crossed and generates the appropriate control signals as required to position the beam to the track specified by the external controller 51.

The position of the focused beam on the video disc is determined by the position of the radial mirror 29 (FIG. 3) which, in turn, is a function of current through mirror winding 50 (FIG. 4). The current for positioning the radial mirror is provided by a mirror drive power amplifier 59 in response to an input signal applied through an input 60. The output of the drive power amplifier 59 is applied to winding 50 through a high pass filter 61 which blocks direct current components of the power amplifier signal. Current through the winding produces a feedback signal across a resistor 62 connected between the winding and circuit ground which is then feed back to the drive power amplifier through a normally closed electronic feedback switch 63.

During normal operation of the playback unit, the input to the mirror drive power amplifier 59 is provided by track position control circuits 64 which, in conjunction with the control processor 52, develop in a manner well known to the art a radial position error signal indicative of beam position radial misalignment. The radial position error signal is applied through line 65 to one input of a loop switch 66, the output of which is applied through a dual input signal adder 67 and to the input 60 of mirror drive power amplifier 59. Ordinarily, the loop switch 66 and signal adder 67 pass the radial position error signal to the mirror drive power amplifier 59.

The playback unit further includes track position sensor circuits 68 which develop signals indicative of the instantaneous beam position. Derivation of the signals may best be understood by reference to FIG. 5. As shown in that figure, the recording surface 31 of the recording disc 13 includes a number of pits 69 arranged in a spiral track 70. Each pit comprises a depression in the recording surface and as the focused beam is swept across, the intensity of the reflected beam varies.

A "clipped radial" (CR) signal in the form of a shaped pulse is derived fro a radial error signal obtained from the reflected beam as it is swept across the recording tracks. The CR signal has the waveform shown in FIG. 5. As illustrated, the CR signal undergoes two sense transitions for each track traversed by the focused beam. A second signal, the track position indicator (TPI) signal, corresponds to the CR signal but time shifted in a known manner so that the center of each LOGIC-HIGH pulse occurs when the focused beam crosses the center of each track. It will be appreciated that the duration of the CR and TPI pulses will be a function of the sweep speed of the beam across the tracks, i.e. the slower the sweep speed, the longer the time required to traverse the intertrack spaces and hence the longer the CR and TPI pulse durations.

Referring again to FIG. 4, the rapid track access circuit of the present invention includes a drive pulse circuit 73 which develops control signals which serve to operate the radial mirror in the rapid track access mode. The rapid track access circuit further includes an interface circuit 74 which permits the radial mirror servo to be selectively controlled by either the existing normal mode playback circuitry or the random track access circuitry as instructed by the external controller 51 and the control processor 52.

When instructed by external controller 51, control processor 52 produces an "on" signal on line 53 which is applied to interface circuit 74. The interface circuit 74 responds by producing an appropriate control signal which is applied to loop switch 66 through line 75, causing the loop switch to isolate the track position control circuits 64 from the mirror drive power amplifier 59 with the result that those circuits no longer control the position of the radial mirror. This causes control of the radial mirror position to pass to the random track access circuitry. In further response to the "on" signal, the interface circuit 74 produces a feedback switch (FBS) output signal which when applied to feedback switch 63 through line 76 causes the feedback switch to open to reduce damping of the radial mirror's movement thereby permitting rapid deflection of the mirror. The FBS signal is also applied to a normally open electronic shunt switch 77 across high pass filter 61 which, in response, closes to effectively remove the high pass filter from the radial mirror circuit to permit direct access to the mirror winding 50.

Referring again to FIG. 5, it will be apparent that the logic state transitions of the CR and TPI signals are functionally dependent on the direction in which the beam is swept across the recording tracks 70. For example, when the beam is swept from left to right in the figure, the CR signal undergoes a LOW to HIGH transition when the beam is midway between adjacent tracks. However, when the beam is swept from right to left, the CR signal undergoes a HIGH to LOW transition when the beam reaches the same point. The rapid track access circuitry includes a trigger pulse conditioner 78 to which the TPI and CR signals are applied through lines 79 and 80, respectively, and which, in a manner to be described, processes the CR and TPI signals to provide a beam position signal which is independent of beam sweep direction. This signal is applied to the drive pulse circuit 73 through line 81.

Figure 6:
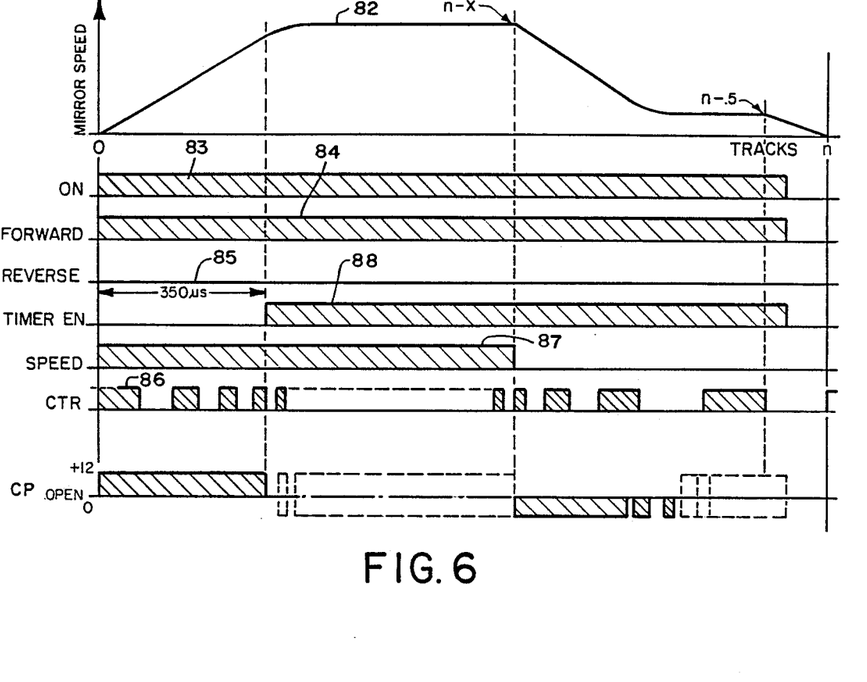
FIG. 6 is a graphical depiction of certain waveforms of the system illustrated in FIG. 4 useful in understanding the operation thereof.

The signal waveforms developed by the rapid track access circuit for application to the radial mirror servo are illustrated in FIG. 6. These waveforms depict a rapid shift in beam position from a present position "0" to a position "n" which corresponds to a position a like number of frames ahead of the present position. The upper waveform 82 of FIG. 6 depicts the speed of the mirror as it is moved to rapidly access track "n". As shown in the figure, the mirror speed is first increased at uniform acceleration until a first desired mirror speed is reached. This mirror speed is maintained until the position of the beam reaches some predetermined number of frames "X" removed from the desired branch location "n". When this point, designated "n−X" is reached, the mirror speed is reduced at uniform deceleration until a second constant speed, lower than the first constant speed, is reached. This second speed is maintained until the beam reaches a position one-half track removed from the desired branch location. At this point, the mirror speed is uniformly reduced to zero as the beam reaches branch location "n". While the foregoing has described branching to a location adhead of the current beam location "0", branching to a position behind the current beam location could easily be accomplished through deflection of the mirror in the opposite direction.

The control signals provided by the control processor 52 as well as the track count CTR signal provided by the trigger pulse conditioner 78 are also shown in FIG. 6. As shown, both the "on" and "forward" signals are LOGIC-HIGH during a forward branching operation while the "reverse" signal is LOGIC-LOW: If a reverse jump had been specified by the instructions supplied by external controller 51 (FIG. 4), the "forward" signal would be LOW and the "reverse" signal would be HIGH. The CTR waveform 86 shows that as the mirror speed increases, the pulses, which are individually produced each time the focused beam crosses a recording track, become of shorter period and of higher frequency. The "speed" waveform 87 is HIGH until the focused beam reaches position "n=X" as shown. The "timer enable" signal 88 is normally LOW but goes HIGH after a delay sufficient to allow the mirror speed to reach the first desired constant speed. In the example shown, this delay is 350 microseconds.

To obtain rapid acceleration of the radial mirror at the beginning and end of a branch operation, suitably polarized coarse pulses, developed by the drive pulse circuit 73 and applied to the interface circuit 74, are applied through a level shift circuit 89 to the signal adder 67, and thus to the input 60 of the mirror drive power amplifier 59. The level shift circuit 89 suitably conditions the coarse pulse signal for application to mirror drive amplifier 59. The mirror drive power amplifier 59 supplies current to the radial mirror winding 50 in accordance with the input signal provided by the level shift circuit 89 causing the radial mirror to be rapidly deflected as to cause forward or reverse deflection of the focused beam. Forward acceleration of the mirror is accomplished through application of a positive going pulse while reverse deflection of the mirror is accomplished through application of a negative going pulse.

The waveforms of the coarse pulses applied to the radial mirror winding 50 during rapid acceleration of the mirror are illustrated in the lowermost waveform of FIG. 6. When the mirror is in the middle position over its range of deflection, it is deemed to be in the neutral position, and accordingly output of the mirror drive power amplifier 59 during normal operation is, in the example shown, +6 volts. To rapidly deflect the mirror in a forward direction, the output of the amplifier 59 is increased to +12 volts while the mirror is rapidly slowed by reducing the output of amplifier 59 to 0 volts.

During the constant mirror speed portions of the branching operation, the drive pulse circuit 73, in accordance with the invention, generates correction pulses for maintaining the desired constant mirror speed. If mirror speed exceeds the desired constant speed, the circuit generates a series of "slow-down" pulses which, when applied to the mirror, retard its velocity to maintain the desired constant speed. Similarly, "speed-up" pulses are developed when mirror speed is below that which is desired, and serve to increase the mirror speed to the desired speed.

Figure 7:
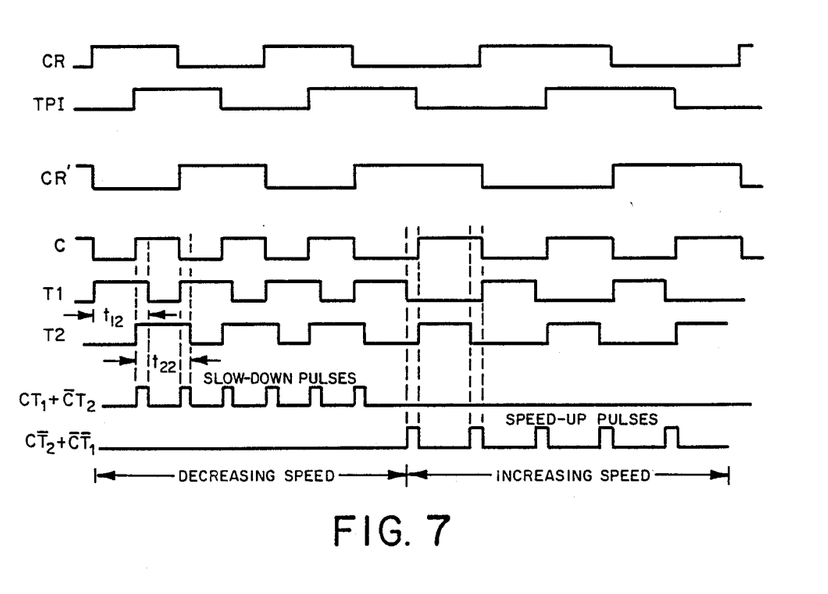
FIG. 7 is a graphical depiction of certain additional waveforms of the system illustrated in FIG. 4 useful in understanding the operation thereof.

The derivation of the slow-down and speed-up pulses may best be understood by reference to FIG. 7. The left hand portion of the figure depicts waveforms resulting when mirror speed exceeds the desired speed, while the waveforms shown in the right hand portion of the figure result when mirror speed is too slow. When the mirror speed is increased, the relative duration of the CR and TPI pulses is reduced since less time is required for the focused laser beam to traverse each track.

Basically, each change in CR and TPI pulse duration provides the basis for generating the appropriate speed control pulses. To this end, a clock (C) signal is developed which triggers a pair of timers, e;ach of which develops a pulse of fixed duration. The C signal is derived by performing the logical operation C=CR'⊕(TPI+SPEED) where CR'=$\overline{CR}$, and ⊕ corresponds to the EXCLUSIVE-OR logic function. Accordingly, C will be LOGIC-HIGH when CR and TPI are of similar logic state and LOGIC-LOW when the signals are of dissimilar logic state. Accordingly, during low speed operation of the mirror, the pulse frrequency of the C signal will be twice that of the CR signal. The purpose for increasing the pulse frequency of the C signal is to permit greater sensitivity of the speed compensation circuit to errors in mirror speed.

The random track access circuitry includes a pair of timers, the first of which is triggered by the negative going transition of the C signal pulses and the second of which is triggered by the positive going transition of those pulses. When triggered, each of the timers produces a single pulse of equal and constant duration. The signals T1 and T2 produced respectively by the first and second timers are illustrated in FIG. 7. As further illustrated in the figure, the slow-down pulses SD are derived by performing the logical operation SD=C.T1+$\overline{C}$.T2, while the speed-up pulses SU correspond to the logical operation SU=C.T2+$\overline{C}$.$\overline{T1}$.

When the mirror is moving at the desired constant speed, the duration of each pulse will be equal to that of each timer pulse and accordingly the negative going transition of each T1 pulse will occur simultaneously with the positive going transition of each T2 pulse. When this balance is achieved, neither speed-up nor slow-down pulses will be produced. If, however, the mirror speed is too fast, the duration of each C pulse will be reduced causing the positive going transition of the T2 pulse to occur prior to termination of the preceding T1 pulse. The duration of each slow-down pulse is equal to the period during which the T1 and T2 pulses are simultaneously high.

When the speed of the mirror is less than the desired constant speed, a relatively greater period is required for the focused laser beam to traverse the recording track resulting in a relative increase in the duration of the CR and TPI pulses. Accordingly, the C pulses will similarly increase in duration. As shown in FIG. 7, when this occurs each T1 pulse will terminate before the initiation of the following T2 pulse resulting in a period during which the T1 and T2 outputs are both LOGIC-LOW. The speed-up pulses each have a duration equal to the period during which T1 and T2 are simultaneously low.

The application of the slow-down and speed-up pulses to the mirror results in correction of the mirror speed with a corresponding increase or decrease in the C pulse duration with the effect that the duration of each slow-down or speed-up pulse is reduced as the mirror approaches its desired speed. When the desired speed is reached, the correction pulses are no longer generated.

As previously noted, during the branching operation, the mirror is driven at two different constant speeds, the first of which exceeds the second. These speeds are determined by the duration of the pulses supplied by the first and second timers. During high speed operation, the pulse duration of the T1 and T2 signals may each be, for example, 10 microseconds. During low speed operation, the T1 and T2 periods may be increased to, for example, 30 microseconds. It will be noted that during low speed operation, in order to generate a sufficient number of speed-up or slow-down pulses, the frequency of the C signal is preferably twice that of the CR signal. However, during high speed operation, such doubling of the C signal frequency is not required since the duration of the T1 and T2 pulses may easily be set to a duration sufficiently short as to generate a sufficient number of speed-up or slow-down pulses to maintain accurate mirror speed.

Figure 8:
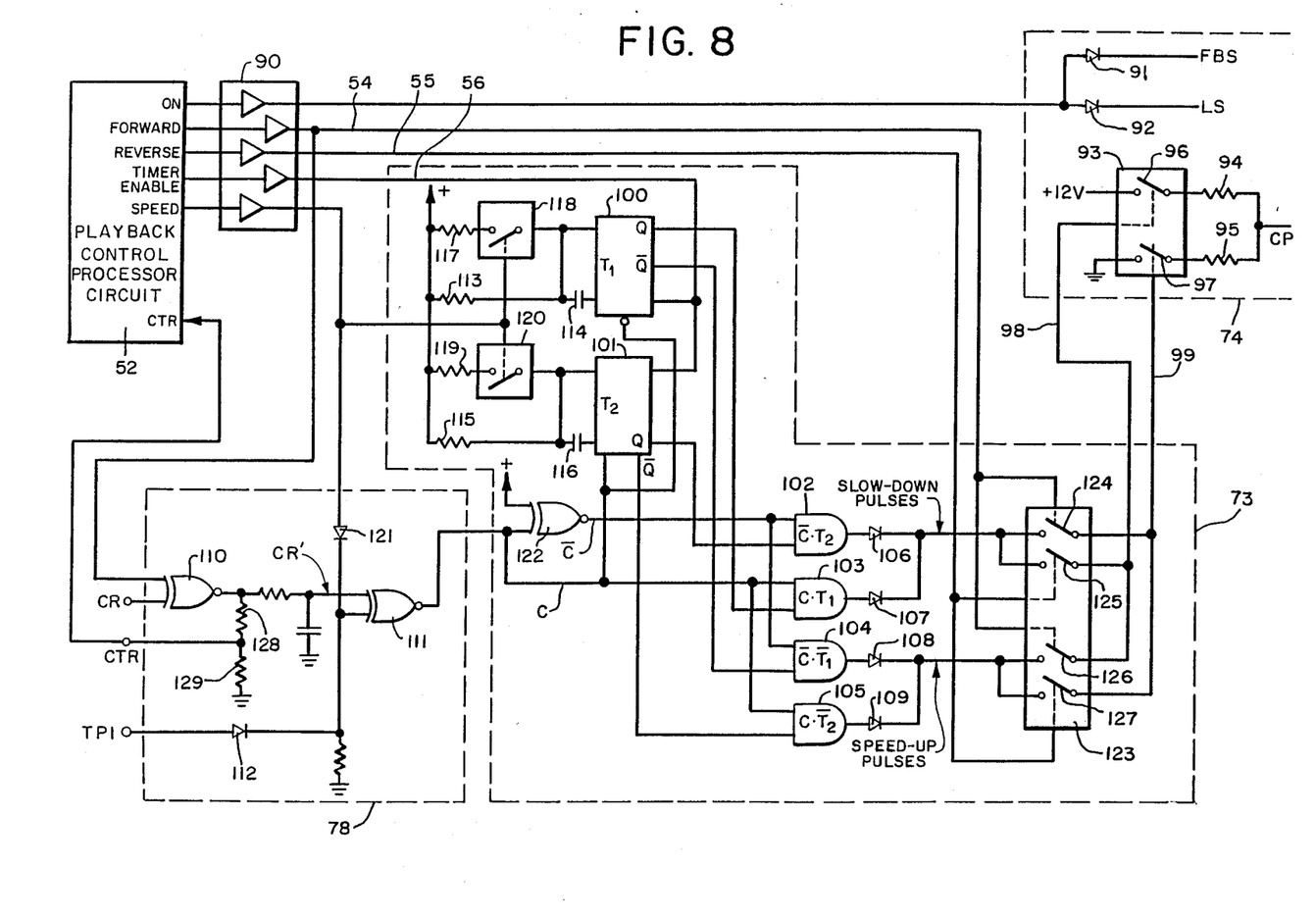
FIG. 8 is a simplified electrical schematic diagram of the rapid track access system.

The rapid track access circuitry is shown schematically in FIG. 8. The control signal outputs from the control processor 52 are applied to amplifiers 90 which change the +5 volt control processor outputs to +12 volt signals for application to the rapid track access circuitry logic gates. Within interface circuit 74, the feedback switch and loop switch control signals are each derived from the "on" signal through forward biased diodes 91 and 92 respectively.

The coarse pulse (CP) signal is produced within interface 74 by means of a dual electronic switch 93 and resistors 94 and 95. One lead of resistor 94 is connected to one lead of resistor 95 while their remaining leads are connected to +12 volts and ground respectively through switch segments 96 and 97 of switch 93. Actuation of switch segments 96 and 97 is controlled through application of suitable control signals on control gate lines 98 and 99. The CP signal is provided at the juncture of resistor 94 and 95 and thus it will be appreciated that the signal will be HIGH when switch 96 is closed and switch 97 is open, LOW when switch 97 is closed and switch 96 is open, and intermediate when both switches are closed.

The CP signals which control radial mirror movement are produced through application of suitable control signals on switch control lines 98 and 99. These control signals are provided by the drive pulse circuit 73. This circuit includes a pair of timers 100 and 101 which produce the T1 and T2 signals illustrated in the waveforms of FIG. 7. The circuit further includes four AND gates 102-105 which perform the logic functions illustrated in the figure. As shown, the Q output of timer 101 is applied to an input of gate 102. The $\overline{Q}$ output of timer 101 is applied to an input of gate 105. The Q output of timer 100 is applied to an input of gate 103 while the $\overline{Q}$ output of the timer is applied to an input of gate 104. The C signal shown in FIG. 7 is applied to the remaining inputs of gates 103 and 105 while the complementary signal $\overline{C}$ is applied to the remaining inputs of gates 102 and 104. When so connected, the gates 102-105 perform the logic functions indicated in the figure.

The slow-down pulses, having the waveforms indicated in FIG. 7, are derived from the outputs of gates 102 and 103 through diodes 106 and 107 which perform a logic OR function on the outputs supplied by those gates. Similarly, the speed-up pulses, derived from the outputs of gates 104 and 105 through diodes 108 and 109 correspond to the logic OR function being performed on the outputs of those gates.

The C and $\overline{C}$ signals applied to gates 102-105 are derived from the CR and TPI signals applied to the trigger pulse conditioner circuit 78. As illustrated, the trigger pulse conditioner 78 includes a pair of EXCLUSIVE-OR gates 110 and 111. The CR and forward signals are applied to the input of gate 110. This gate serves to eliminate the previously mentioned dependence of the CR signal on the direction that the beam is scanned across the recording disc. During forward scanning of the beam, the forward line will be high and thus gate 110 will pass the non-inverted CR signal. However, when the beam is scanned in the reverse direction, the forward line will be low and thus the gate will pass an inverted CR signal. The effect is that the output signal CR' will be the same relative to beam location despite the direction of beam scanning.

During slow speed movement of the mirror, it is desirable to increase the pulse frequency of the C signal by doubling the CR' signal in order to more accurately control the mirror speed. This is accomplished by applying the CR' signal from the output of gate 110 to an input of EXCLUSIVE-NOR gate 111. The TPI signal whose waveform is illustrated in FIG. 7, is applied through diode 112 to the remaining input of gate 111. Since TPI and CR' are each of the same pulse frequency but of different phase, the output of gate 111 will have a pulse frequency of twice that of either CR' or TPI as shown in FIG. 7.

To provide two constant, distinct mirror deflection speeds, timers 100 and 101 each provide long and short duration pulses in accordance with a control signal supplied by the control processor 52. The duration of the timer pulse supplied by timer 100 is determined by the time constant of resistor 113 and capacitor 114 while the duration of the pulse provided by timer 101 is determined by resistor 115 and capacitor 116. These component values are selected so that the pulse provided by timer 100 matches that provided by timer 101. During slow speed operation of the mirror, it is desired to reduce the period of the pulses supplied by timers 100 and 101. In the case of timer 100, this is accomplished by connecting a second resistor 117 in parallel across resistor 113 by means of an electronic switch 118 to effectively shorten the time constant of the network. Similarly, a resistor 119 connected across resistor 115 by means of electronic switch 120 reduces the duration of the pulse provided by timer 101.

Electronic switches 118 and 120 are each controlled by the SPEED signal provided by control processor 52. Diode 121, is connected to the SPEED output and together with diode 112 performs a LOGIC-OR function between the SPEED and TPI signals. Accordingly, when the speed signal is HIGH, the transitions of the TPI signal will not affect the output of gate 111 and accordingly, the pulse frequency of the C signal appearing at its output will no longer be twice that of the CR' signal but rather will be of the same frequency as that signal since during high speed operation of the mirror the relatively elevated frequency of the C signal is not required. The output of gate 111 is also applied to one input of EXCLUSIVE-NOR gate 122 and the other input of which is applied to the positive supply voltage. Accordingly, gate 122 serves as an invertor to provide the inverted C signal $\overline{C}$.

The signals applied to the interface circuit 74 through control lines 98 and 99 which produce the CP signal and hence control mirror movement are supplied through a four segment electronic switch 123. As previously developed, a HIGH signal on control line 98 will result in rapid forward scanning of the radial mirror while a HIGH signal applied on control line 99 will cause the mirror to accelerate in the opposite direction. As illustrated, control line 98 is connected to switch segments 125 and 126, the remaining terminals of which are connected to the source of the slow-down and speed-up pulses respectively. Similarly, control line 99 is connected to switch segments 124 and 127, the remaining terminals of which are also connected to the source of slow-down and speed-up pulses respectively. The control gates for 124 and 126 are connected to the forward direction control line 54 while the control gates for switch segments 125 and 127 are connected to the reverse direction control line 55. Accordingly, when a HIGH signal is applied to the forward control line 54, switches 124 and 126 will close with the result that slow-down pulses are applied to control line 99 and speed-up pulses, when developed, will be applied to control line 98. When a HIGH signal is applied to reverse direction control line 55, switch segments 125 and 127 will close with the effect that slow-down pulses will be applied to control line 98 and speed-up pulses will be applied to control line 99.

At the beginning of a rapid track access jumping sequence, it is desired to rapidly accelerate the mirror to the desired constant speed. This is accomplished by disabling timers 100 and 101 for a period during which the mirror is accelerated through application of a coarse pulse. Timers 100 and 101 are enabled through application of the TIMER ENABLE signal through TIMER ENABLE line 56 to suitable inputs of timers 100 and 101. During the time that these timers are disabled and that a HIGH signal is present on either the forward or reverse direction control lines 54 and 55, the mirror will be rapidly deflected until it approaches the desired constant speed.

To enable the control processor 52 to ascertain the relative beam position during rapid scanning, the count track (CTR) signal is applied to an input of the control processor. The CTR signal is derived from the output of gate 110 through a resistor divider comprises resistors 128 and 129.

The control signals supplied by the random track access circuit vary according to the distance of the desired branch location from the current beam location. When a jump of more than 25 frames is commanded by the external control circuit, the operation of the random track access circuit and the motion of the mirror will be as previously described. However, when a jump of between one and 25 frames is required, the timers are enabled after a time delay of only 50 microseconds, as opposed to 350 microseconds in the case of jumps greater than 25 frames. When a jump of one track is required the on line is pulled high for approximately 50 microseconds, causing the mirror to accelerate for that period. When the on line is pulled low, control of the mirror is returned to the playback control processor. This control is provided through suitable programming of the control processor 52.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An optical video disc playback apparatus in which video signals which have been recorded in successive tracks on the surface of an optical video disc are retrieved by a playback beam which follows the successive tracks, such apparatus being adapted to rapidly relocate the playback beam from any initial track location to any other track location on the disc recording surface within a predetermined distance from the initial track location without following the intervening tracks there-between, such relocation being effected during a relocation interval in response to externally supplied instructions to such apparatus specifying such other track location, such apparatus comprising:

means for scanning the playback beam across the disc recording surface, such scanning means comprising a pivotally mounted mirror which controls the position of the playback beam on said disc, a servo actuator for controlling the pivoting of said mirror, and a feedback circuit for controlling said servo actuator to pivot said mirror so as to cause the playback beam to follow the tracks on said disc;

track position sensing means for producing track position sensing signals indicating passage of the playback beam across the tracks on said disc;

a control processor responsive to said track position sensing signals and to said externally supplied instructions to produce control signals signifying the speed and direction of pivoting of said mirror in order to relocate said playback beam from said initial track to said specified track;

and circuit means responsive to the control signals from said control processor to supply drive pulses to said servo actuator which cause it to pivot said mirror so that said playback beam is relocated in continuous movement from said initial track to said specified track without following the intervening tracks and at a rate dependent on the distance to said specified track;

said drive pulses comprising an initial coarse pulse during an initial portion of said relocation interval for accelerating the pivotting of said mirror during such initial portion of the relocation interval, speed correction pulses during an intermediate portion of the relocation interval for accurately maintaining the pivotting of said mirror at a uniform speed during such intermediate portion of the relocation interval, and a further coarse pulse during a final portion of the relocation interval for decelerating the pivotting of said mirror during such final portion of the relocation interval;

said drive pulse circuit means further supplying switching signals to disable said feedback circuit during said relocation interval.

2. Apparatus in accordance with claim 1, wherein the control signals supplied by said control processor to said drive pulse circuit means control the durations of the pulses produced thereby so that the rates of acceleration and deceleration of said mirror and the uniform pivoting speed thereof vary in accordance with the number of intervening tracks to be traversed by said playback beam during relocation thereof from said initial track to said other specified track.

3. Apparatus in accordance with claim 1, wherein said servo actuator comprises a coil, the pivoting of said mirror being controlled by the durations of the pulses supplied to said coil by said drive pulse circuit means.

* * * * *